United States Patent
Parekh et al.

(10) Patent No.: US 10,630,657 B2
(45) Date of Patent: Apr. 21, 2020

(54) SYSTEM AND METHOD FOR ENHANCING THE SECURITY OF DATA PACKETS EXCHANGED ACROSS A COMPUTER NETWORK

(71) Applicant: COLORTOKENS, INC., Santa Clara, CA (US)

(72) Inventors: Pankaj Parekh, Fremont, CA (US); Ashish Trivedi, Fremont, CA (US); Harish Magganmane, San Jose, CA (US); Ravi Voleti, Fremont, CA (US)

(73) Assignee: COLORTOKENS, INC. CA (US)

( * ) Notice: Subject to any disclaimer, the term of this patent is extended or adjusted under 35 U.S.C. 154(b) by 230 days.

(21) Appl. No.: 15/910,858

(22) Filed: Mar. 2, 2018

(65) Prior Publication Data

US 2018/0255035 A1  Sep. 6, 2018

Related U.S. Application Data

(60) Provisional application No. 62/466,038, filed on Mar. 2, 2017.

(51) Int. Cl.
*H04L 29/06* (2006.01)
*H04L 12/46* (2006.01)
*H04L 29/08* (2006.01)

(52) U.S. Cl.
CPC ...... *H04L 63/0485* (2013.01); *H04L 12/4641* (2013.01); *H04L 63/0471* (2013.01);
(Continued)

(58) Field of Classification Search
CPC ..... H04L 63/0485; H04L 63/10; H04L 69/22; H04L 63/102; H04L 67/104;
(Continued)

(56) References Cited

U.S. PATENT DOCUMENTS 7,804,826 B1 * 9/2010 Khalil ................ H04L 63/0272
370/389
8,130,768 B1 * 3/2012 Ahrens .................. H04L 45/00
370/352

(Continued)

*Primary Examiner* — Ali S Abyaneh
*Assistant Examiner* — Shu Chun Gao
(74) *Attorney, Agent, or Firm* — Barry Choobin; Patent 360 LLC

(57) ABSTRACT

The present disclosure envisages establishing a virtual overlay network between the source computer and the destination computer (in addition to a typical, unsecured, public computer network already connecting the source computer and the destination computer), and designating the source computer and destination computer to be identified on the virtual overlay network only by the corresponding source private IP address and destination private IP address. The present disclosure envisages an intermediary server for creating and subsequently managing the virtual overlay network. The intermediary server renders the virtual overlay network accessible only to the source computer and the destination computer to communicate with one another and to exchange data packets using the source private IP address and destination private address and the corresponding private ports, while ensuring that the virtual overlay network remains inaccessible to any other computer on the underlying public computer network.

12 Claims, 5 Drawing Sheets

Figure 1:
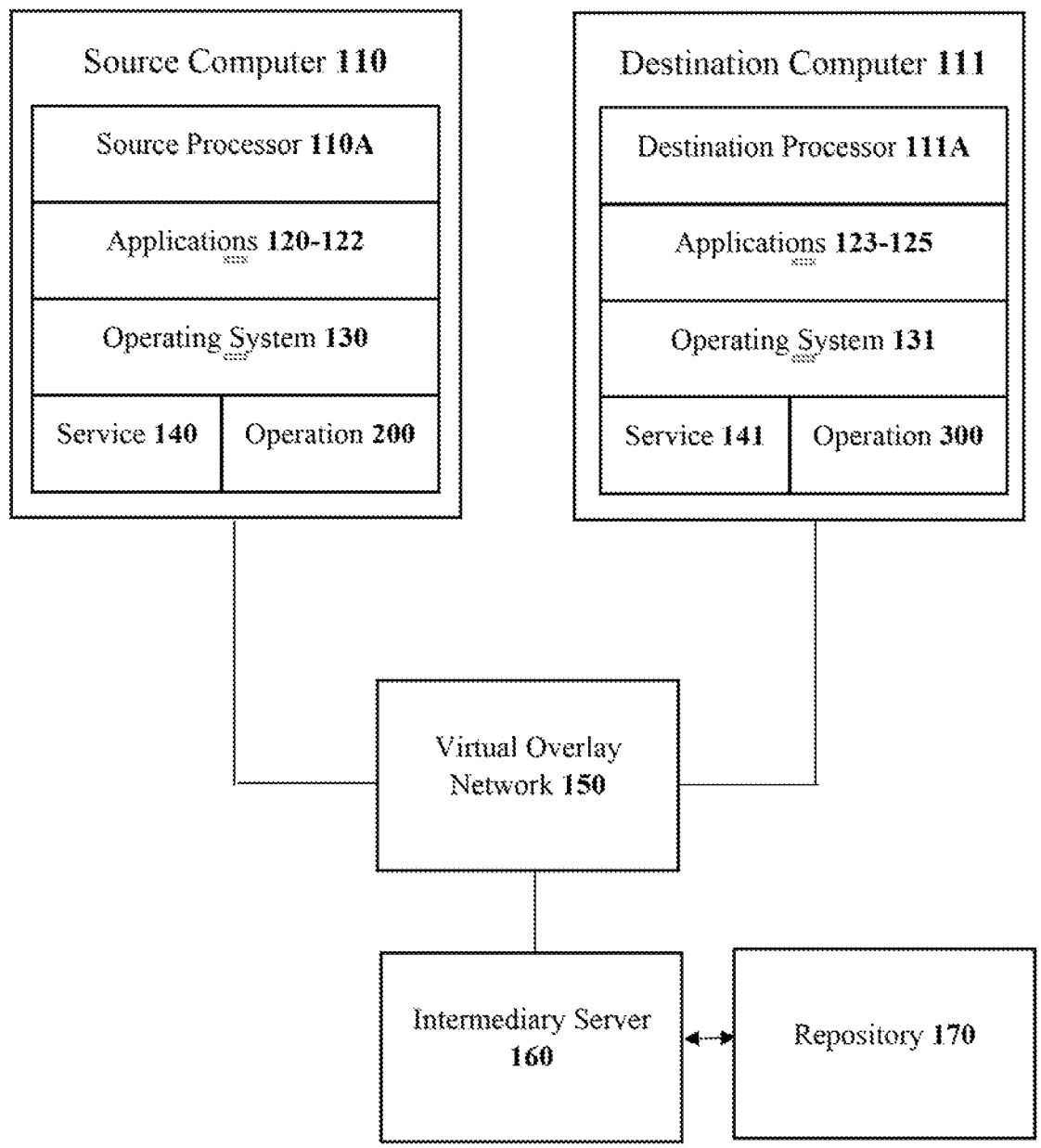

(52) U.S. Cl.
CPC ............ *H04L 63/10* (2013.01); *H04L 63/102* (2013.01); *H04L 67/104* (2013.01); *H04L 69/22* (2013.01)

(58) Field of Classification Search
CPC . H04L 63/0471; H04L 12/4641; H04L 9/321; H04L 9/3263; H04L 9/3271; H04L 63/0464; H04L 63/166; H04L 2209/56; H04L 2209/80; H04L 45/22; H04L 41/50; H04L 47/193; H04L 47/22; H04L 47/27; H04L 47/38; H04L 47/2441; H04L 29/06; H04L 63/0227; H04L 63/0263; H04L 63/0272; H04L 67/38; H04L 41/0803; H04L 41/28; H04L 61/2514; H04L 67/02; H04L 67/141; H04L 61/2575; H04L 61/305; H04L 67/025; H04L 63/168; H04L 29/12; H04L 61/2589; H04L 61/301; H04L 61/6063; H04L 67/26; H04L 63/0861; H04L 29/12066; H04L 29/12367; H04L 29/12509; H04L 61/2567; H04L 29/12009; H04L 29/1233; H04L 61/25; H04L 63/20; H04L 29/12349; H04L 61/2507; H04L 69/161; H04L 63/0428; H04L 69/16; H04L 29/08846; H04L 63/065; H04L 67/2814; H04L 67/288; H04L 29/12132; H04L 29/12471; H04L 61/1552; H04L 61/2553; H04L 63/029; H04L 67/142; H04L 69/163; H04L 69/164; H04L 63/06; H04L 63/04; H04L 67/143; H04L 67/10; H04L 63/1416; H04L 45/54; H04L 63/1441; H04L 63/1433; H04L 63/02; H04L 63/101; H04L 67/42; G06F 9/4411; G06F 16/95; H04W 12/06; H04W 4/70; G06Q 10/103

See application file for complete search history.

(56) References Cited

U.S. PATENT DOCUMENTS

| | | | | |
|---|---|---|---|---|
| 8,149,722 | B2* | 4/2012 | Mera | H04L 12/4633 370/248 |
| 8,396,954 | B2* | 3/2013 | Nagaraj | H04L 45/22 370/395.21 |
| 8,635,441 | B2* | 1/2014 | Frenkel | G06F 21/50 713/153 |
| 9,369,550 | B2* | 6/2016 | Sung | H04L 63/0272 |
| 2017/0244637 | A1* | 8/2017 | Singhal | H04L 45/7453 |
| 2018/0145950 | A1* | 5/2018 | Tabares | H04L 63/0272 |
| 2019/0013967 | A1* | 1/2019 | Ishii | H04W 12/001 |

* cited by examiner

SYSTEM AND METHOD FOR ENHANCING THE SECURITY OF DATA PACKETS EXCHANGED ACROSS A COMPUTER NETWORK

CROSS-REFERENCE TO RELATED APPLICATIONS

The claims disclosed in the present disclosure benefit from the priority associated with the U.S. Provisional Patent Application No. 62/466,038 filed on Mar. 2, 2017 with the title "ENHANCED SECURITY FOR INTER-COMPUTING SYSTEM COMMUNICATION", the contents of which are incorporated herein by the way of reference.

BACKGROUND

Technical Field

The present disclosure relates to computer implemented systems and methods that facilitate secured transmission of data packets across a computer network. Particularly, the present disclosure relates to a computer-implemented system and method that facilitates communication of data packets on a secured virtual overlay network built atop a conventional public computer network.

Description of the Related Art

Typically, data processing applications process and transmit highly confidential and business critical information. Computer resource security necessitating utmost importance in such scenarios prompt network administrators to look beyond the conventional network security phenomenon such as password locks, firewalls, authorisation controls, authentication techniques and cryptographic techniques.

However, when multitude of computer terminals are interconnected in a distributed computer network, with each of the computer terminals requesting incessant data access from storage devices and data files, employing effective security across the entirety of the distributed computer network becomes a challenge. One of the common techniques employed by network administrators to ensure that the computer network remains secured is to prevent un-trusted computer devices from accessing the computer network, by introducing any of the well-known access control mechanisms into the computer network.

Typically, access control mechanisms scan the computer network to identify the computer terminals requesting access thereto, and subsequently verify whether the said computer terminals are authorized to request access to the computer network. Typically, access rights and authentication information associated with each of the computer terminals are analysed prior to granting the computer terminals with necessary access rights and permissions to access the computer network (and the network resources).

However, in case of conventional public networks, the connections between various participating computer terminals is pre-defined/pre-established. The network connections are typically pre-defined using router/switches for a quick establishment of a communication link the participating computer terminals, whenever there arises a requirement. Even though conventional public networks with pre-defined network connections to each of the participating computer terminals offer improvements in terms of the time taken to establish inter-network/intra-network communications, pre-defined network connections nevertheless are vulnerable to the threat of a security breach, given the fact the pre-defined network connections are visible to every participating device present on the network and are easily accessible and traversable.

Therefore, in order to obviate the security issues associated with conventional public computer networks, there was felt a need for a computer implemented system and method that introduces dynamicity into a computer network by creating a virtual overlay network between a first computer terminal and a second computer terminal only after receiving a request to that extent from the first computer terminal and only after duly verifying the credentials of the first computer terminal as well as the second computer terminal. Further, there is also felt a need for a computer implemented system and method that renders the virtual overlay network inaccessible (invisible) to every other computer terminal connected to the underlying public network and ensures that any computer terminal accessing the virtual overlay network is duly authenticated (and its credentials and access permissions duly verified) before being allowed to access the virtual overlay network. Further, there has also been felt a need for a computer implemented system and method that does away with pre-established/pre-defined/pre-configured computer networks and facilitates creation of a secured, virtual overlay network in a dynamic manner, only after receiving access request(s) from any of the computing systems forming a part of the conventional public network, and only after verifying the credentials of the requesting computing systems as well as that of the computing resources (for example, an application server, a web server or a peer computing system) that have been requested access to.

OBJECTS

An object of the present disclosure is to envisage a computer-implemented system and method that provides cohesive inter-network and intra-network security.

Another object of the present disclosure is to envisage a computer-implemented system and method that provides computer systems competing for network resources, with controlled access to the network resources, subsequent to validating the credentials of the said computer systems and the credentials of the requested network resources.

Yet another object of the present disclosure is to envisage a computer-implemented system and method that establishes a private, secured virtual overlay network between a source computer and a destination computer, only after verifying the credentials thereof.

Another object of the present disclosure is to envisage a computer-implemented system and method that does away with pre-configured/pre-established computer networks and creates a virtual overlay network in a dynamic manner, only after reviving a request to that extent from a source computer.

One more object of the present disclosure is to provide a secured alternative—to conventional public networks having pre-defined network connections/paths—in the form of a private, virtual overlay network.

Still a further object of the present disclosure is to render the private, virtual overlay network invisible and therefore inaccessible to any computing device whose credentials have not been duly validated.

Another object of the present disclosure is to envisage a computer-implemented system and method that makes use of virtual, private IP addresses to facilitate communications between a source computer and a destination computer.

SUMMARY

In order to overcome the drawbacks discussed hitherto, the present disclosure envisages a system providing cohesive inter-computing system security (a plurality of computing devices interconnected in a computer network). The system envisaged by the present disclosure incorporates a DNS server (hereafter referred to as an intermediary server) that provides seamless and selectively controlled communication between the plurality of computing devices in the computer network (a network of interconnected client devices and server devices, a network of interconnected source computer and destination computer). When a communication request is initiated from a computing device (source computer) for connecting to a destination computer, the intermediary server verifies the identity of the computing device (i.e. source computer) generating the communication request, as well as the computing device to which the connection/access is requested (i.e. destination computer). Only if the verification is affirmative, a dynamic and preferably temporary private communication link is established between designated computing devices (a source computer and a destination computer) using corresponding virtual private IP address.

In accordance with the present disclosure, the source processor initiates a communication initiation request for establishing a private connection, and therefore a private communication session between the source computer and the destination computer. A source private IP address, a destination private IP address, and information indicating a source private port and a destination private port relevant to the communication request are determined. Preferably, the source private IP address, the destination private IP address, and the information indicating the source private port and the destination private port (collectively referred to as 'private addressing information') are determined based on a source public IP address, a destination public IP address, a source public port and a destination public port (collectively referred to as 'public addressing information') initially specified by the communication initiation request. Subsequently, the 'private addressing information' and the 'public addressing information are embedded with the 'communication initiation request'.

Thereafter, a data packet is created by the source computer encapsulating the aforesaid communication initiation request and the private addressing information and the public addressing information. The data packet is preferably bifurcated into a header portion and a payload portion, with the header portion incorporating the communication initiation request and the public addressing information, in an unencrypted format, and the payload portion incorporating the private addressing information and the data to be consumed by the destination computer, in an encrypted format. Further, the data packet is transmitted from the source computer to the intermediary server, instead of being transmitted to a Transmission Control Protocol/Internet Protocol (TCP/IP) portion of the operating system of the source computer, as is the case in a typical, well-known packet transmission scenario.

In accordance with the present disclosure, the intermediary server controls exchange of data packets between the source computer and the destination computer based on permission information defined for the computer network, and stored in a repository accessible to the intermediary server. The permission information acts as a basis for facilitating selective and controlled exchange of data packets between the plurality of computing devices in the computer network. The permission information includes information relating to a plurality of source private ports, a plurality of destination private ports, a plurality of source private IP addresses and a plurality of destination IP addresses eligible for requesting access to the private, virtual overlay network. A private, virtual overlay network is established between the source computer and the destination computer only if the source computer and the destination computer are determined to be associated with (respective) private IP addresses and private ports which also find a mention in the permission information and therefore are deemed eligible to be used for the creation of the private, virtual overlay network.

In accordance with the present disclosure, the intermediary server decrypts the payload portion of the data packet to identify the private IP addresses and the private ports corresponding to the source computer and the destination computer. Further, the eligibility of the source computer and the destination computer to be connected by the private, virtual overlay network is determined based on the comparison between the permission information and the private IP addresses and the private ports corresponding to the source computer and the destination computer. In an event that the source computer and the destination computer are held eligible to be connected by the private, virtual overlay network, by the virtue of the private IP addresses and the private ports respectively corresponding to the source computer and the destination computer, being mentioned as a part of the private IP addresses and private ports specified by the permission information, then the intermediary server triggers the destination computer to establish a private communication session with the source computer via the said private, virtual overlay network. The private, virtual overlay network and the consequential private communication session is established between the destination computer and the source computer using respective private IP addresses and respective private ports. The virtual overlay network is identified by the private addressing information corresponding to the source computer and the destination computer, and is rendered invisible and therefore inaccessible to all the computer terminals which are a part of the conventional public network underlying the private, virtual overlay network.

BRIEF DESCRIPTION OF THE ACCOMPANYING DRAWINGS

Figure 2A:
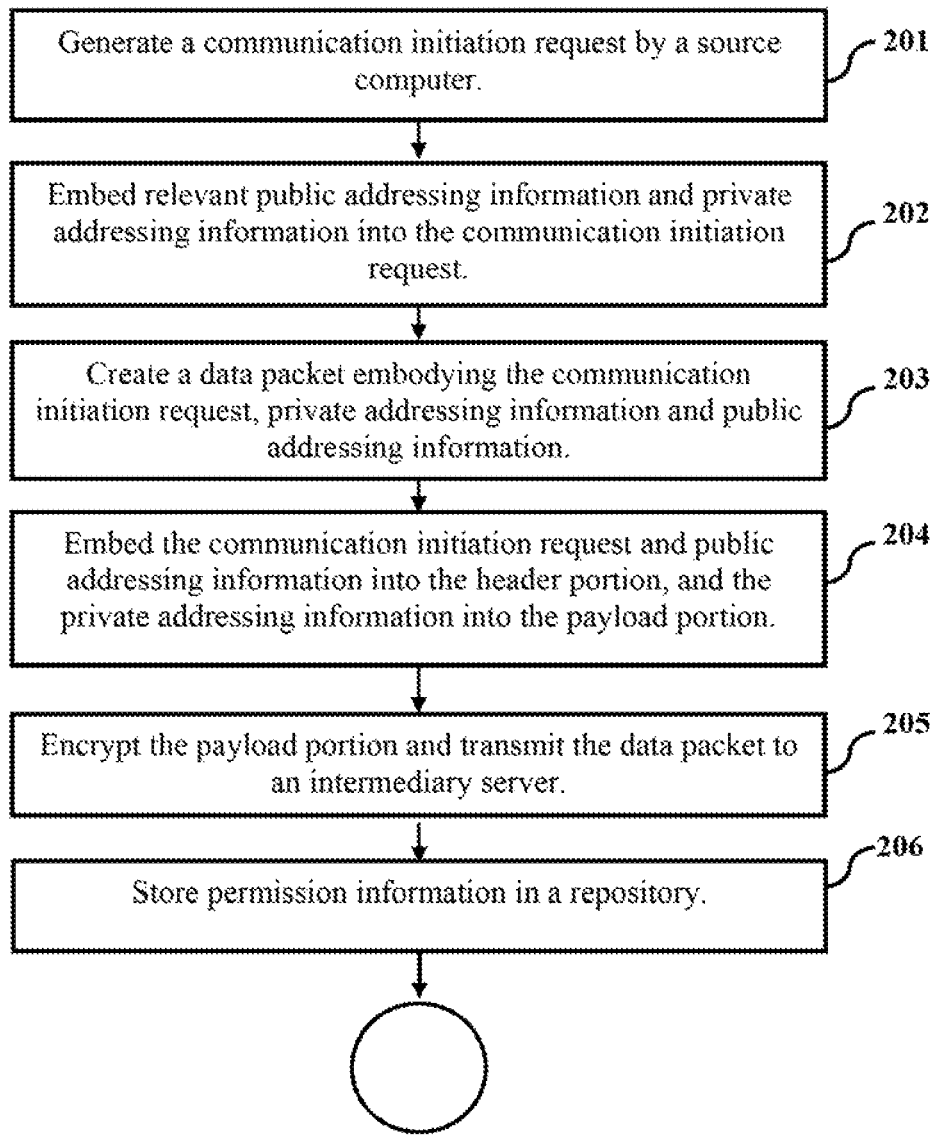
Figure 2B:
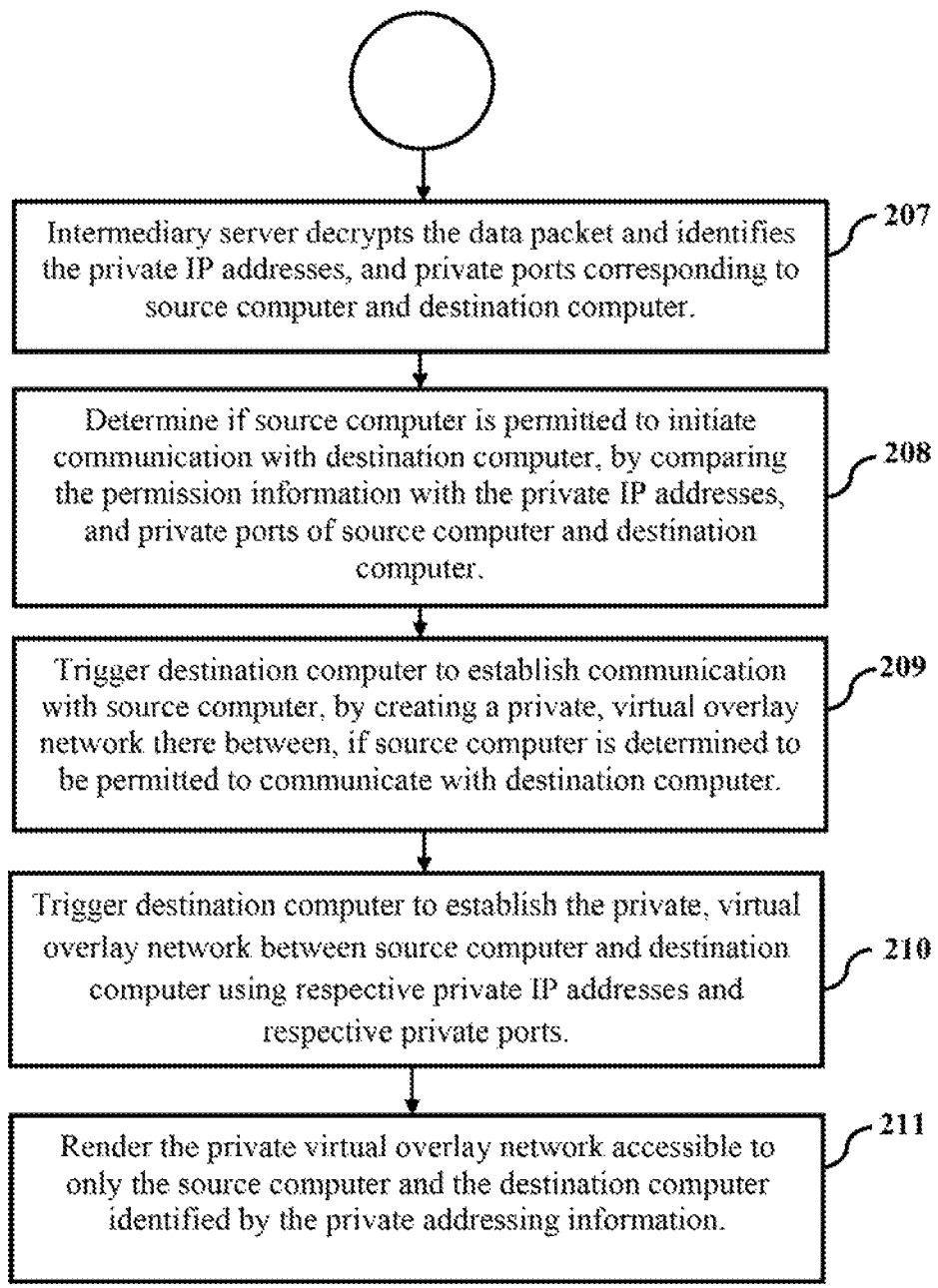
Figure 3:
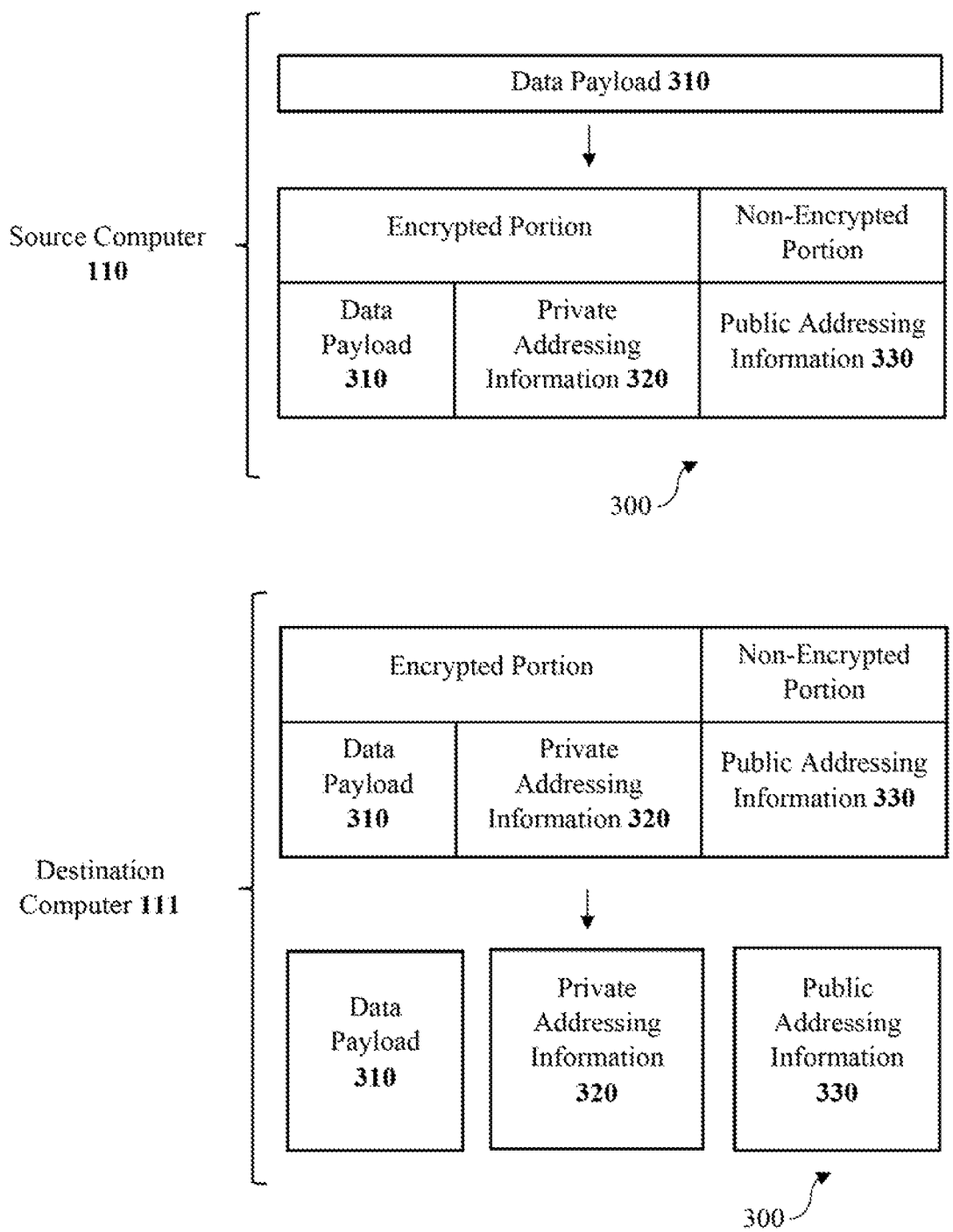
Figure 4:
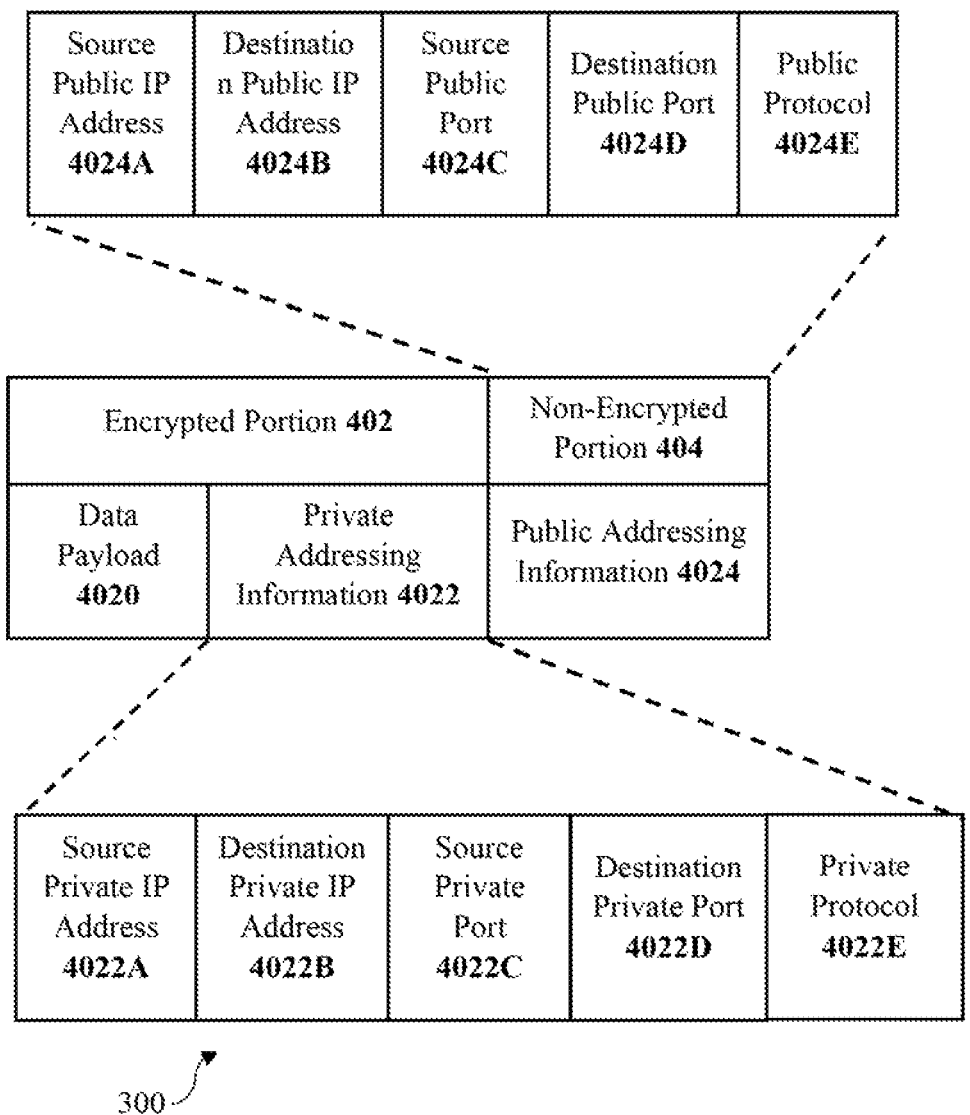

FIG. 1 illustrates a secured computer network providing for secured data communication from a source computer to a destination computer, in accordance with the present disclosure;

FIG. 2A and FIG. 2B in combination illustrate a flowchart describing the steps involved in the method for enhancing security of data packets exchanged across a computer network;

FIG. 3 is a block diagram illustrating the format of the data packet incorporating a 'communication initiation request' generated by the source computer, in accordance with the present disclosure; and FIG. 4 is a block diagram illustrating the format of the header portion and the payload portion of the data packet incorporating the 'communication initiation request' generated by the source computer, in accordance with the present disclosure.

It is to be noted that throughout the specification, and throughout the aforementioned drawings, like features have been denoted using like numerals.

DETAILED DESCRIPTION

The present disclosure envisages improvements and enhancements corresponding to managing secure data communications between a source computer and a destination computer, which in turn are a part of a computer network. Any computer system, regardless of being a part of a computer network or functioning as a standalone system, includes various applications that often are required to communicate with other computing systems (such as a web server) to execute designated operation and provide the desired results.

For instance, in an organization's computing network, an application executed on a first computing system (referred to 'source computer' hereafter) is typically required to perform a plurality of look-up operations on a database resident on a second computing system (referred to as 'destination computer' hereafter). In order to consult the database and perform the desired look-up operations, the source computer generates a data packet embodying a 'communication initiation request' generated by the said application (executed on the source computer). The data packet thus generated includes a header portion incorporating the 'communication initiation request' and the relevant public addressing information—the public addressing information including at least the source public IP address and the source public port corresponding to the source computer, and the destination public IP address and the destination public port corresponding to the destination computer. Further the data packet also includes a payload portion which is embedded with the data to be consumed by the destination computer and the private addressing information—the private addressing information including at least the source private IP address and the source private port corresponding to the source computer, and the destination private IP address and the destination private port corresponding to the destination computer.

In order to improve the security associated with the data packet transmitted from the source computer to the destination computer, the data packet which is generated by the source computer is routed to an intermediary server—which is entrusted with the task of managing the transmission and processing of the data packet in a secured manner—instead of being transmitted to a Transmission Control Protocol/Internet Protocol (TCP/IP) portion of the operating system of the source computer, as is the case in a typical, well-known packet transmission scenario.

In accordance with the present disclosure, the 'communication initiation request' generated by a source processor resident on the source computer is incorporated into the header portion of the data packet. The 'communication initiation request' typically specifies at least the source public IP address and the source public port from which the 'communication initiation request' emanated, and the destination public IP address and the destination public port to which the 'communication initiation request' is to be directed. In an exemplary embodiment of the present disclosure, the destination public IP address could be identified by the source processor based on a uniform resource locator (URL) or a uniform resource indicator (URI) corresponding to the destination computer, and the destination public port could further be identified based on the destination public IP address.

In accordance with the present disclosure, the information embodied in the 'communication initiation request', i.e. the source public IP address, the source public port, the destination public IP address and the destination public port, is utilized as a basis to look-up for and determine the private addressing information, i.e., the source private IP address, the source private port, the destination private IP address, the destination private port.

Preferably, the private addressing information, i.e. the source private IP address, the source private port, the destination private IP address, and the destination private port, which are determined based on the information embodied in the 'communication initiation request', are encrypted using well known encryption techniques and subsequently embedded into the payload portion of the data packet along with any relevant data (corresponding to the 'communication initiation request, and intended to be consumed by the destination computer'). Preferably, the payload portion of the data packet is an encapsulation of the 'private addressing information' and the relevant data required to be consumed by the destination computer for granting the communication initiation request.

In accordance with the present disclosure, the data packet thus generated is transmitted to an intermediary server—which is entrusted with the task of managing the transmission and processing of the data packet in a secured manner—instead of being transmitted to a Transmission Control Protocol/Internet Protocol (TCP/IP) portion of the operating system of the source computer, as is the case in a typical, well-known packet transmission scenario.

The intermediary server, soon after receiving the data packet, decrypts the payload portion thereof—using well known decryption techniques, and bifurcates the header portion of the data packet from the payload portion. An analysis of the header portion of the data packet describes the 'communication initiation request' generated by the source computer and intended to be transmitted to the destination computer, and the corresponding public addressing information, i.e. the source public IP address, the source public port, the destination public IP address and the destination public port. Further, an analysis of the payload portion of the data packet, by the intermediary server describes the data intended to be consumed by the destination computer, and the private addressing information, i.e. the source private IP address and the source private port corresponding to the source computer, and the destination private IP address and the destination private port corresponding to the destination computer.

The intermediary server, after decrypting and analyzing the received the data packet, determines whether the said data packet is permitted to be transmitted to the destination computer. The intermediary server preferably compares the source private IP address, the source private port, the destination private IP address and the destination private port, elicited from the 'communication initiation request', with the entries stored in a repository. The entries stored in the said repository correspond to the 'permission information' that describes a plurality of source private IP addresses and source private ports allowed to request for a communication, and a plurality of destination private IP addresses and destination private ports that are allowed to be requested for such a communication.

In the event that the source private IP address, the source private port, the destination private IP address and the destination private port, elicited from the 'communication initiation request' match with any of the source private IP addresses, source private ports, destination private IP addresses and destination private ports, then the source computer is determined to be permitted to communicate with the destination computer, and therefore to transmit the data packet to the destination computer by requesting for a communication.

Further, in the event that the source computer is determined to be allowed to communicate with the destination computer, the intermediary server transmits the data packet embodying the 'communication initiation request', the 'private addressing information', and the data (to be consumed by the destination computer) to the destination computer, and triggers the destination computer to communicate with the source computer using the said source private IP address, the source private port, the destination private IP address and the destination private port specified by the 'communication initiation request', and via a virtual overlay network between the source computer and the destination computer.

In accordance with the present disclosure, the intermediary server establishes the virtual overlay network between the source computer and the destination computer (on top of the typical, unsecured, public computer network connecting the source computer and the destination computer) and designates the source computer and destination computer to be identified on the virtual overlay network only by the corresponding source private IP address and destination private IP address. Further, the intermediary server renders the virtual overlay network accessible only to the source computer and the destination computer to communicate with one another and to exchange data packets using the source private IP address and destination private address and the corresponding private ports, while ensuring that the virtual overlay network remains inaccessible to any other computer on the computer network.

In accordance with the present disclosure, FIG. 1 provides an overview of a virtual overlay network 150 providing for secured data communication from the source computer 110 to the destination computer 111. The source computer 110 and the destination computer 111 are communicably coupled to the intermediary server 160 which in turn administrates and manages the creation and implementation of the virtual overlay network 150 between the source computer 110 and the destination computer 111. The source computer 110 typically incorporates a source processor 110A, an operating system 130, and executes a plurality of applications 120-122. Preferably, the execution of any of the applications 120-122 triggers an operation 200. Further, the source computer 110 includes a service 140 that facilitates implementation of the operation 200. Similarly, the destination computer 111 incorporates a destination processor 111A, an operating system 131, and executes a plurality of applications 123-125, with the execution of any of the applications 123-125 triggering an operation 300 at the destination computer 111. The implementation of the operation 300 is supported by the service 141, at the destination computer.

In accordance with the present disclosure, the applications 120-122 and 123-125 executed by the source computer 110 and destination computer 111 respectively include but are not restricted to database applications, web service applications, email applications, gaming applications, and front-end applications. Typically, during the execution of any of the above-mentioned applications, the source computer 110 and in turn the source processor 110A might necessitate a communication with the destination computer 111. For example, a web browsing application executed by the source processor 110A might necessitate a look up on a database hosted on the destination computer 111. Therefore, in such cases, a 'communication initiation request' embodying a destination public IP address (identifying the location of the database) and the data to be consumed by the database while performing the desired lookup operation, is generated by the source computer 110. Preferably, the 'communication initiation request' also identifies the destination public port to be used for transmitting the 'communication initiation request' to the destination computer 111. Further, the 'communication initiation request' also identifies the source public IP address identifying the source computer 110 generating the 'communication initiation request' and the source public port from which the 'communication initiation request' is transmitted.

Subsequently, the 'communication initiation request' is embodied into a data packet (denoted by reference numeral 300 in FIG. 3 and FIG. 4) comprising a header portion and the data portion. Preferably, the header portion (of the data packet) incorporates the 'communication initiation request' and the public addressing information including the source public IP address, the source public port (corresponding to the source computer), and the destination public IP address, the destination public port (corresponding to the destination computer). Preferably, the payload portion of the data packet incorporates the 'data' to be consumed by the destination computer 111 for performing the operation requested for by the source computer 110, and the private addressing information including the source private IP address, the source private port (corresponding to the source computer), and the destination private IP address, the destination private port (corresponding to the destination computer). Preferably, the payload portion of the data packet incorporating the 'data' and the 'private addressing information' is encrypted prior to the transmission of the data packet, using well known data encryption techniques.

Subsequently, the data packet thus generated by the source processor 110A is transmitted from the source computer 110 to the intermediary server 160—which is entrusted with the task of managing the transmission and processing of the data packet in a secured manner—instead of being transmitted to a Transmission Control Protocol/Internet Protocol (TCP/IP) portion of the operating system 130 of the source computer 110, which would have been the case in a typical, well-known packet transmission scenario.

The intermediary server 160, soon after receiving the data packet, decrypts the payload portion thereof—using well known decryption techniques, and bifurcates the header portion of the data packet from the payload portion. An analysis—by the intermediary server 160—of the header portion of the data packet describes the 'communication initiation request' generated by the source computer 110 and intended to be transmitted to the destination computer 111, and the corresponding public addressing information, i.e. the source public IP address, the source public port (identifying the source computer 110), and the destination public IP address and the destination public port (identifying the destination computer 111).

Further, an analysis of the payload portion of the data packet, by the intermediary server 160 describes the data intended to be consumed by the destination computer 111, and the private addressing information, i.e. the source private IP address and the source private port corresponding to the source computer 110, and the destination private IP address and the destination private port corresponding to the destination computer 111.

The intermediary server 160, after decrypting and analyzing the received the data packet, determines whether the said data packet is permitted to be transmitted to the destination computer 111. The intermediary server 160 preferably compares the source private IP address, the source private port, the destination private IP address and the destination private port, elicited from the 'communication initiation request', with the entries stored in a repository 170. The entries stored in the repository 170 correspond to the 'permission information' that describes a plurality of source private IP addresses and source private ports allowed to request for a communication, as well as a plurality of destination private IP addresses and destination private ports that are allowed to be requested for a communication.

In the event that the source private IP address, the source private port, the destination private IP address and the destination private port, elicited from the 'communication initiation request' match with any of the source private IP addresses, source private ports, destination private IP addresses and destination private ports, then the source computer 110 is determined to be permitted to communicate with the destination computer 111, and therefore to transmit the data packet to the destination computer 111 thereby requesting a communication.

Further, in the event that the source computer 110 is determined to be allowed to communicate with the destination computer 111, the intermediary server 160 transmits the data packet embodying the 'communication initiation request', the 'private addressing information', and the 'data' to the destination computer 111, and triggers the destination computer 111 to establish a secured, private connection (in the form of the overlay network 150) with the source computer 110 using the said source private IP address, the source private port, the destination private IP address and the destination private port specified by the 'communication initiation request'.

In accordance with the present disclosure, the intermediary server 160 establishes the virtual overlay network 150 between the source computer 110 and the destination computer 111 (in addition to a typical, unsecured, public computer network already connecting the source computer 110 and the destination computer 111), and designates the source computer 110 and destination computer 111 to be identified on the virtual overlay network 150 only by the corresponding source private IP address and destination private IP address. Further, the intermediary server 160 renders the virtual overlay network 150 accessible only to the source computer 110 and the destination computer 111 to communicate with one another and to exchange data packets using the source private IP address and destination private address and the corresponding private ports, while ensuring that the virtual overlay network 150 remains inaccessible to any other computer on the computer network.

FIG. 2A and FIG. 2B in combination illustrate a flowchart explaining the steps involved in a computer-implemented method for enhancing the security of data packets exchanged across a computer network, in accordance with the present disclosure. The method provides secure and selectively controlled communication between a plurality of computing devices in a computer network. In accordance with the present disclosure, the source processor initiates a communication initiation request for establishing a private connection, and therefore a private communication session between the source computer and the destination computer (step 201). A source private IP address, a destination private IP address, and information indicating a source private port and a destination private port relevant to the communication request are determined. Preferably, the source private IP address, the destination private IP address, and the information indicating the source private port and the destination private port (collectively referred to as 'private addressing information') are determined based on a source public IP address, a destination public IP address, a source public port and a destination public port (collectively referred to as 'public addressing information') initially specified by the communication initiation request. Subsequently, the 'private addressing information' and the 'public addressing information are embedded with the 'communication initiation request' (step 202).

Thereafter, a data packet is created by the source computer encapsulating the aforesaid communication initiation request and the private addressing information and the public addressing information (step 203). The data packet is preferably bifurcated into a header portion and a payload portion, with the header portion incorporating the communication initiation request and the public addressing information, in an unencrypted format, and the payload portion incorporating the private addressing information and the data to be consumed by the destination computer, in an encrypted format (step 204). Further, the data packet is transmitted from the source computer to the intermediary server at step 205, instead of being transmitted to a Transmission Control Protocol/Internet Protocol (TCP/IP) portion of the operating system of the source computer, as is the case in a typical, well-known packet transmission scenario.

In accordance with the present disclosure, the intermediary server controls exchange of data packets between the source computer and the destination computer based on permission information defined for the computer network, and stored in a repository accessible to the intermediary server (step 206). The permission information acts as a basis for facilitating selective and controlled exchange of data packets between the plurality of computing devices in the computer network. The permission information includes information relating to a plurality of source private ports, a plurality of destination private ports, a plurality of source private IP addresses and a plurality of destination IP addresses eligible for requesting access to the private, virtual overlay network. A private, virtual overlay network is established between the source computer and the destination computer only if the source computer and the destination computer are determined to be associated with (respective) private IP addresses and private ports which also find a mention in the permission information and therefore are deemed eligible to be used for the creation of the private, virtual overlay network.

In accordance with the present disclosure, the intermediary server decrypts the payload portion of the data packet to identify the private IP addresses and the private ports corresponding to the source computer and the destination computer (step 207). Further, the eligibility of the source computer and the destination computer to be connected by the private, virtual overlay network is determined based on the comparison between the permission information and the private IP addresses and the private ports corresponding to the source computer and the destination computer (step 208). In an event that the source computer and the destination computer are held eligible to be connected by the private, virtual overlay network, by the virtue of the private IP addresses and the private ports respectively corresponding to the source computer and the destination computer, being mentioned as a part of the private IP addresses and private ports specified by the permission information, then the intermediary server triggers the destination computer to establish a private communication session with the source computer via the said private, virtual overlay network (step 209). The private, virtual overlay network and the consequential private communication session is established between the destination computer and the source computer using respective private IP addresses and respective private ports (step 210). The virtual overlay network is identified by the private addressing information corresponding to the source computer and the destination computer, and is rendered invisible and therefore inaccessible to all the computer terminals which are a part of the conventional public network underlying the private, virtual overlay network (step 211).

In accordance with the present disclosure, FIG. 3 is a block diagram illustrating the format of the data packet incorporating a 'communication initiation request' generated by the source computer 110. As shown in FIG. 3, the data packet 300 generated by the source computer 110 includes a data payload 310, the private addressing information 320, and public addressing information 330. In accordance with the present disclosure, the data payload 310 refers to the data to be consumed by the destination computer 111 in order to execute an operation requested for by the source computer 110. Further, the private addressing information includes the source private IP address and the source private port corresponding to the source computer 110, and the destination private IP address and the destination private port corresponding to the destination computer 111. The private addressing information is essentially used to setup the virtual overlay network 160 between the source computer 110 and the destination computer 111.

Further, the public addressing information includes the source public IP address, the source public port (identifying the source computer 110), and the destination public IP address and the destination public port (identifying the destination computer 111). The public addressing information is essentially used to setup an unsecured, public network (not shown in figures) between the source computer 110 and the destination computer 111. As described in FIG. 3, the data payload is encapsulated with the private addressing information, and subsequently encrypted using well-known data encryption techniques. As shown in FIG. 3, the encrypted portion of the data packet 300 is the combination of the data payload and the private addressing information, whereas the non-encrypted portion of the data packet 300 is the public addressing information.

Further, the data packet 300 transmitted from the source computer 110 is received at the intermediary server 160, which in turn processes the data packet 300 and subsequently decrypts the data packet 300 to separate the encrypted portion thereof from the non-encrypted portion, i.e. the intermediary server 160 separates the (combination of) data payload and the private addressing information from the public addressing information, and subsequently analyzes the data payload, the private addressing information and public addressing information as described with reference to FIG. 1 and FIG. 2.

Referring to FIG. 4, there is shown a block diagram illustrating a detailed format of the data packet 300 incorporating a 'communication initiation request' generated by the source computer 110. FIG. 4 offers a more detailed view of the data packet 300 generated by the source computer 110. As shown in FIG. 4, the data packet 300 generated by the source computer 110 includes an encrypted portion 402 and a non-encrypted portion 404. The encrypted portion 402 is a combination of data 4020 (application data/data payload) intended to be consumed by the destination computer 111 to execute an operation requested for by the source computer 110, and the private addressing information 4022. Further, the non-encrypted portion 404 incorporates the public addressing information 4024.

As shown in FIG. 4, the private addressing information 4022 includes source private IP address 4022A, destination private IP address 4022B, (information indicative of) source private port 4022C and destination private port 4022D and a private protocol 4022E. The private addressing information 4022 including the source private IP address 4022A, destination private IP address 4022B, (information indicative of) source private port 4022C and destination private port 4022D and private protocol 4022E are essentially utilized to setup the virtual overlay network 160 between the source computer 110 and the destination computer 111.

In accordance with the present disclosure, the source private IP address 4022A and the destination private IP address 4022B are preferably virtual IP addresses which are accessible only on the virtual overlay network 160, and are invisible to any other computer system present on an underlying unsecured public network. Further, in case of the virtual overlay network 160 established between the source computer 110 and the destination computer 111, the source private IP address 4022A is visible and accessible only to the destination computer 111, and the destination private address 4022B is visible and accessible only to the source computer 110.

Further, the source private port 4022C indicates the port from which the 'communication initiation request' subsequently embodied into the data packet 300 emanates, whereas the destination port 4022D indicates the port which is destined to receive the 'communication initiation request' embodied into the data packet 300. Essentially, the virtual overlay network 160 utilizes the source private IP address 4022A, destination private IP address 4022B, source private port 4022C, destination private port 4022D and private protocol 4022E to route the data packet 300 from the source computer 110 to the destination computer 111.

In accordance with the present disclosure, the public addressing information 4024 includes source public IP address 4024A, destination public IP address 4024B, (information indicative of) source public port 4024C and destination public port 4024D and public protocol 4024E. The public addressing information 4024 including the source public IP address 4024A, destination public IP address 4024B, (information indicative of) source public port 4024C and destination public port 4024D and public protocol 4024E are essentially utilized to setup an unsecured, public network between the source computer 110 and the destination computer 111, upon which the virtual overlay network 150 is typically constructed.

In accordance with the present disclosure, the public addressing information 4024 including source public IP address 4024A, destination public IP address 4024B, source public port 4024C and destination public port 4024D and a public protocol 4024E, are utilized by the intermediary server 160 to determine the private addressing information (including source private IP address 4022A, destination private IP address 4022B, source private port 4022C and destination private port 4022D and private protocol 4022E), for establishing the virtual overlay network 160 between the source computer 110 and the destination computer 111.

Essentially, the source private IP address 4022A, destination private IP address 4022B, source private port 4022C, destination private port 4022D and the private protocol 4022E utilized by the intermediary server 150 to establish a virtual overlay network between source computer 110 and destination computer 111, are different that the source public IP address 4024A, destination public IP address 4024B, (information indicative of) source public port 4024C and destination public port 4024D and a public protocol 4024E specified by the source computer 110 as a part of the 'communication initiation request'.

TECHNICAL ADVANTAGES

The system and method envisaged by the present disclosure facilitates secured communication between a source computer and a destination computer by establishing a private, virtual overlay communication network therebetween. The system envisaged by the present disclosure dynamically generates a virtual overlay network connecting the source computer and the destination computer, only after verifying the credentials, and especially the private IP addresses of the source computer as well as the destination computer. The system renders the virtual overlay network secure and private, by ensuring that the said virtual overlay network is identifiable only by the private IP addresses assigned to the source computer and the destination computer, and that the said virtual overlay network remains invisible and therefore inaccessible to any computer systems connected to the unsecured, public computer network. The system provides an effective policy-based control mechanism that facilitates validation of communication requests based on the access rights assigned to the computing devices requesting such a communication as well as that of the computing devices that have been requested access to, thereby ensuring that the private, virtual overlay network is accessible only to authorized and validated computer systems.

What is claimed is:

1. A computer-implemented system for enhancing security of data packets exchanged across a computer network, said system comprising:
    a source processor residing on a source computer, said source processor configured to:
    generate a communication initiation request for establishing a private communication session between said source computer and a destination computer forming a part of the computer network;
    identify, based on said communication initiation request, private addressing information corresponding to said communication initiation request, said private addressing information comprising a source private IP address, a destination private IP address, a source private port, a destination private port and a protocol, for supporting a private communication between said source computer and said destination computer;
    create a data packet embodying said communication initiation request, said data packet comprising at least a header portion and a payload portion;
    embed said communication initiation request into said header portion, and further embed said private addressing information, into said payload portion;
    selectively encrypt at least said payload portion of said data packet, and redirect said data packet to an intermediary server;
    said intermediary server cooperating with said source computer and said destination computer, said intermediary server configured to receive said data packet from said source computer, said intermediary server comprising: a repository storing at least permission information corresponding to the computer network, said permission information indicative of at least a plurality of source private ports and a plurality of destination private ports configured to facilitate exchange of the data packets, a plurality of source private IP addresses and a plurality of destination private IP addresses configured to facilitate said exchange of the data packets, and a plurality of protocols to be used for said exchange of the data packets;
    said intermediary server further configured to: process said data packet, and decrypt at least said payload portion thereof, and identify said destination computer to which said data packet is to be transmitted, based at least upon said destination private IP address and information indicative of said destination private port, embedded into said payload portion;
    determine, based on a comparison between said permission information and said private addressing information embedded into said payload portion, whether said source computer is permitted to initiate said private communication session with said destination computer;
    transmit said data packet to said destination computer, and trigger said destination computer to establish said private communication session with said source computer, if it is determined that the source computer is permitted to initiate said private communication session with said destination computer; and
    trigger said source computer and said destination computer to establish said private communication session using said source private IP address, said source private port and said destination private IP address, said destination private port respectively;
    said intermediary server configured to establish a virtual overlay network between said source computer identifiable by said source private IP address, and said destination computer identifiable by said destination private IP address, to facilitate said private communication session, said intermediary server configured to render said virtual overlay network accessible only to said source computer identifiable by said source private IP address and said destination computer identifiable by said destination private IP address.

2. The system as claimed in claim 1, wherein said communication initiation request generated by said source computer further specifies a source public IP address and a source public port corresponding to said source computer, and a destination public IP address and a destination public port corresponding to said destination computer, and wherein said private addressing information corresponding to said communication initiation request is identified based on at least said source public IP address, said source public port, said destination public IP address and said destination public port.

3. The system as claimed in claim 1, wherein said source computer is further configured to redirect said data packet to said intermediary server, only in an event that said data packet incorporates said private addressing information.

4. The system as claimed in claim 1, wherein said intermediary server is further configured to compare said source private IP address and said destination private IP address specified by said payload portion, with said permission information indicative of said plurality of source private IP addresses and said plurality of destination IP addresses, to determine whether there exists a match between said source private IP address and said destination private IP address specified by said payload portion and said permission information.

5. The system as claimed in claim 1, wherein said intermediary server is further configured to compare said source private port and said destination private port specified by said payload portion, with said permission information indicative of said plurality of source private ports and said plurality of destination private ports, to determine whether there exists a match between said source private port and said destination private port specified by said payload portion and said permission information.

6. A computer-implemented method for enhancing security of data packets exchanged across a computer network, said method comprising following computer implemented steps:
generating a communication initiation request for establishing a private communication session between a source computer and a destination computer forming a part of the computer network;
identifying, by said source computer, based on said communication initiation request, private addressing information corresponding to said communication initiation request, said private addressing information comprising a source private IP address, a destination private IP address, a source private port, a destination private port and a protocol, for supporting a private communication between said source computer and said destination computer;
creating, by said source computer, a data packet embodying said communication initiation request, said data packet comprising at least a header portion and a payload portion;
embedding, by said source computer, said communication initiation request into said header portion, and embedding said private addressing information, into said payload portion;
selectively encrypting, by said source computer, at least said payload portion of said data packet, and redirecting, by said source computer said data packet to an intermediary server;
receiving, by said intermediary server, said data packet from said source computer;
storing in a repository, at least permission information corresponding to the computer network, said permission information indicative of at least a plurality of source private ports and a plurality of destination private ports configured to facilitate exchange of the data packets, a plurality of source private IP addresses and a plurality of destination IP addresses configured to facilitate said exchange of the data packets, and a plurality of protocols to be used for said exchange of the data packets;
processing, by said intermediary server, said data packet, and decrypting, by said intermediary server, at least said payload portion thereof;
identifying, by said intermediary server, said destination computer to which said data packet is to be transmitted, based at least upon said destination private IP address and information indicative of said destination private port, embedded into said payload portion;
determining, by said intermediary server, based on a comparison between said permission information and said private addressing information embedded into said payload portion, whether said source computer is permitted to establish said private communication session with said destination computer; and
triggering, by said intermediary server, said destination computer to establish said private communication session with said source computer, if it is determined, by said intermediary server that the source computer is permitted to establish said private communication session with said destination computer; and
triggering, by said intermediary server, said source computer and said destination computer to establish said private communication session using said source private IP address, said source private port and said destination private IP address, said destination private port respectively;
establishing, by said intermediary server, a virtual overlay network between said source computer identifiable by said source private IP address, and said destination computer identifiable by said destination private IP address, to facilitate said private communication session; and
rendering said virtual overlay network accessible only to said source computer identifiable by said source private IP address and said destination computer identifiable by said destination private IP address.

7. The method as claimed in claim 6, wherein the method further includes following steps:
generating a communication initiation request incorporating a source public IP address and a source public port corresponding to said source computer, and a destination public IP address and a destination public port corresponding to said destination computer; and
identifying said private addressing information corresponding to said communication initiation request, based on at least said source public IP address, said source public port, said destination public IP address and said destination public port.

8. The method as claimed in claim 6, wherein said source computer is further configured to redirect said data packet to said intermediary server, only in an event that said data packet incorporates said private addressing information.

9. The method as claimed in claim 6, wherein the step of determining, based on a comparison between said permission information and said private addressing information, further includes the step of comparing said source private IP address and said destination private IP address specified by said payload portion, with said permission information indicative of said plurality of source private IP addresses and said plurality of destination IP addresses stored in said repository, and determining said source computer to be permitted to initiate a private communication session with said destination computer, in case of a match between said source private IP address and said destination private IP address specified by said payload portion and said permission information.

10. The method as claim 6, wherein the step of determining, based on a comparison between said permission information and said private addressing information, further includes the step of comparing said source private port and said destination private port specified by said payload portion, with said permission information indicative of said plurality of source private ports and said plurality of destination private ports, and determining said source computer to be permitted to initiate a private communication session with said destination computer, in case of a match between said source private port and said destination private port specified by said payload portion and said permission information.

11. A non-transitory computer readable storage medium having computer-readable instructions stored thereupon, the instructions when executed by the processor cause the processor to:
generate a communication initiation request for facilitating a private communication session between a source computer and a destination computer forming a part of the computer network;
identify based on said communication initiation request, private addressing information corresponding to said communication initiation request, said private addressing information comprising a source private IP address, a destination private IP address, a source private port, a destination private port and a protocol, for supporting a private communication between said source computer and said destination computer;

create a data packet embodying said communication initiation request, said data packet comprising at least a header portion and a payload portion;

embed said communication initiation request into said header portion, and further embed said private addressing information, into said payload portion;

selectively encrypt at least said payload portion of said data packet;

cause at least permission information corresponding to the computer network to be stored in a repository, said permission information indicative of at least a plurality of source private ports and a plurality of destination private ports configured to facilitate exchange of the data packets, a plurality of source private IP addresses and a plurality of destination IP addresses configured to facilitate said exchange of the data packets, and a plurality of protocols to be used for said exchange of the data packets;

process said data packet, and decrypt at least said payload portion thereof;

identify said destination computer to which said data packet is to be transmitted, based at least upon said destination private IP address and information indicative of said destination private port, embedded into said payload portion;

determine, based on a comparison between said permission information and said private addressing information embedded into said payload portion, whether said source computer is permitted to establish said private communication session with said destination computer; and trigger said destination computer to establish said private communication session with said source computer, if it is determined that the source computer is permitted to establish said private communication session with said destination computer;

trigger said source computer and said destination computer to establish said private communication session using said source private IP address, said source private port and said destination private IP address, said destination private port respectively;

establish a virtual overlay network between said source computer identifiable by said source private IP address, and said destination computer identifiable by said destination private IP address, to facilitate said private communication session; and render said virtual overlay network accessible only to said source computer identifiable by said source private IP address and said destination computer identifiable by said destination private IP address.

12. The computer-readable instructions as claimed in claim 11, wherein the computer-readable instructions when executed by the processor, further cause the processor to:

generate a communication initiation request incorporating a source public IP address and a source public port corresponding to said source computer, and a destination public IP address and a destination public port corresponding to said destination computer;

identify said private addressing information corresponding to said communication initiation request, based on at least said source public IP address, said source public port, said destination public IP address and said destination public port;

compare said source private IP address and said destination private IP address specified by said payload portion, with said permission information indicative of said plurality of source private IP addresses and said plurality of destination IP addresses stored in said repository, and determine whether there exists a match between said source private port and said destination private port specified by said payload portion and said permission information; and compare said source private port and said destination private port specified by said payload portion, with said permission information indicative of said plurality of source private ports and said plurality of destination private ports, and determine whether there exists a match between said source private port and said destination private port specified by said payload portion and said permission information.

\* \* \* \* \*